US008405856B2

(12) United States Patent
Do et al.

(10) Patent No.: US 8,405,856 B2
(45) Date of Patent: Mar. 26, 2013

(54) IMAGE FORMING APPARATUS AND JOB PERFORMING METHOD

(75) Inventors: Tae-hoi Do, Hwaseong-si (KR); Richard suk-yoon Woo, Seongnam-si (KR); Sang-hyup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 12/662,914

(22) Filed: May 11, 2010

(65) Prior Publication Data

US 2011/0080608 A1    Apr. 7, 2011

(30) Foreign Application Priority Data

Oct. 1, 2009 (KR) .......................... 10-2009-0093772

(51) Int. Cl.
*G06F 3/12* (2006.01)
*G06K 15/00* (2006.01)
*G06F 3/041* (2006.01)
*G09G 5/00* (2006.01)

(52) U.S. Cl. ................. 358/1.15; 358/1.13; 358/1.14; 358/1.16; 358/2.1; 345/173; 345/156

(58) Field of Classification Search ........................ None
See application file for complete search history.

(56) References Cited

U.S. PATENT DOCUMENTS

| 6,055,333 | A  * | 4/2000  | Guzik et al. ............... 382/187 |
| 7,369,702 | B2 * | 5/2008  | Abdulkader et al. ......... 382/187 |
| 8,194,257 | B2 * | 6/2012  | Kuchibhotla et al. ....... 358/1.13 |
| 8,289,295 | B2 * | 10/2012 | Chou ........................... 345/173 |
| 2003/0056100 | A1* | 3/2003 | Beatson ....................... 713/176 |
| 2003/0194130 | A1* | 10/2003 | Kenneth et al. .............. 382/186 |
| 2009/0257078 | A1* | 10/2009 | Sawada et al. ............. 358/1.14 |
| 2009/0307631 | A1  | 12/2009 | Kim et al. |
| 2009/0310178 | A1* | 12/2009 | Tomita et al. ............... 358/1.15 |

FOREIGN PATENT DOCUMENTS

| KR | 10-2006-0106124 | 10/2006 |
| KR | 10-0900295      | 5/2009  |

* cited by examiner

*Primary Examiner* — Satwant Singh
(74) *Attorney, Agent, or Firm* — Staas & Halsey LLP

(57) ABSTRACT

A job performing method of an image forming apparatus which includes a touch screen making a handwriting input available, the method including displaying a handwriting input window in a part of an initial screen displayed on the touch screen and making a user's handwriting input available; inputting a handwriting by the user in the displayed handwriting input window; comparing the input handwriting with a prestored job; and performing the prestored job by the image forming apparatus according to the comparison result. With this, the image forming apparatus provides the shortcut of a function frequently used by a user in an initial screen and enables a user to easily select and perform a particular function or a job.

17 Claims, 7 Drawing Sheets

IMAGE FORMING APPARATUS AND JOB PERFORMING METHOD

CROSS-REFERENCE TO RELATED APPLICATIONS

This application claims priority from Korean Patent Application No. 10-2009-0093772, filed on Oct. 1, 2009, in the Korean Intellectual Property Office, the disclosure of which is incorporated herein by reference.

BACKGROUND

1. Field

Apparatuses and methods consistent with the present embodiments relate to an image forming apparatus and a job performing method thereof, and more particularly, to an image forming apparatus and a job performing method thereof which uses a touch screen that makes a handwriting available.

2. Description of the Related Art

An image forming apparatus forms an image on a print paper. The image forming apparatus may include a printer, a photocopier, a facsimile, a multi-function device which has at least two functions, etc.

The image forming apparatus includes a user operation unit to receive data or various commands from a user. The user operation unit may include an input button (hard key) indicating a function of the image forming apparatus or numbers; or a touch screen (touch pad) displayed on a display unit and receiving an input by a user's touch.

Typically, a user selects a menu and inputs data or a command through the input button or the touch screen.

Recently, demand for an image forming apparatus as an office automation device performing not only a document print function but also a scanning function and faxing function has increased. Accordingly, the image forming apparatus has extended its original functions to perform various functions with high performance.

In accordance with the various functions of the image forming apparatus, a user should sequentially go through several rounds of screen changes to perform a particular function, thereby feeling inconvenient.

SUMMARY

Accordingly, it is an aspect to provide an image forming apparatus and a job performing method thereof which provides a shortcut for a frequently used function on an initial screen and enables a user to easily select and perform a particular function.

Also, it is another aspect to provide an image forming apparatus and a job performing method thereof which uses a shortcut by a user's handwriting and improves usability.

Additional aspects and/or advantages will be set forth in part in the description which follows and, in part, will be apparent from the description, or may be learned by practice of the embodiments.

The foregoing and/or other aspects are also achieved by providing a job performing method of an image forming apparatus which includes a touch screen making a handwriting input available, the method including: displaying a handwriting input window in a part of an initial screen displayed on the touch screen and making a user's handwriting input available; inputting a handwriting by a user in the displayed handwriting input window; comparing the input handwriting with a prestored job; and performing the prestored job by the image forming apparatus according to the comparison result.

The method may further include logging in the image forming apparatus by a user.

The displaying the handwriting input window may include further displaying at least one of a prestored job list and an icon list corresponding to a handwriting input in the handwriting input window.

The job list and the icon list are displayed corresponding to a user who has logged in.

The job list and the icon list may be displayed by a user's request.

The method may further include displaying a job performing result.

The inputting the handwriting may include inputting at least one of a number, a character, a shape and a directional gesture.

The method may further include: setting an option for a predetermined job of the image forming apparatus; and selecting whether to register a shortcut corresponding to the handwriting input with respect to a job for which the option is set.

The method may further include displaying a recommendation list for a name of the registered shortcut according to the selection result.

Another aspect is achieved by providing an image forming apparatus, including: a display unit which displays a handwriting input window making a user's handwriting input available in a part of an initial screen of the image forming apparatus; a user operation unit which includes a touch screen to receive a handwriting input with respect to the displayed handwriting input window; a storage unit which stores therein a job corresponding to the handwriting input; a job performing unit which performs a job for a predetermined function of the image forming apparatus; and a controller which compares the handwriting input received through the touch screen with a job prestored in the storage unit, and controls the job performing unit to perform a corresponding job according to the comparison result.

The user operation unit may receive a user login to the image forming apparatus.

The display unit may further display at least one of a prestored job list and an icon list corresponding to a handwriting input in the handwriting input window.

The job list and the icon list may be displayed corresponding to a user who has logged in.

The job list and the icon list may be displayed by a user's request.

The display unit may display thereon a job performing result.

The handwriting input may include at least one of a number, a character, a shape and a directional gesture.

The job performing unit may include at least one of an image forming unit performing a print operation, an image scanner scanning a document and a communication unit communicating with an external device, and the communication unit includes at least one of a fax communication module transmitting and receiving a fax, a network communication module performing a network communication, and an interface which is connected with an hard disc drive (HDD) or a universal serial bus (USB).

The user operation unit may set an option for a predetermined job of the image forming apparatus and select whether to register a shortcut of the job for which the option is set, corresponding to the handwriting input.

The display unit may display a recommendation list for a name of the registered shortcut according to the selection result.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION

Hereinafter, exemplary embodiments will be described with reference to accompanying drawings, wherein like numerals refer to like elements and repetitive descriptions will be avoided as necessary.

Figure 1:
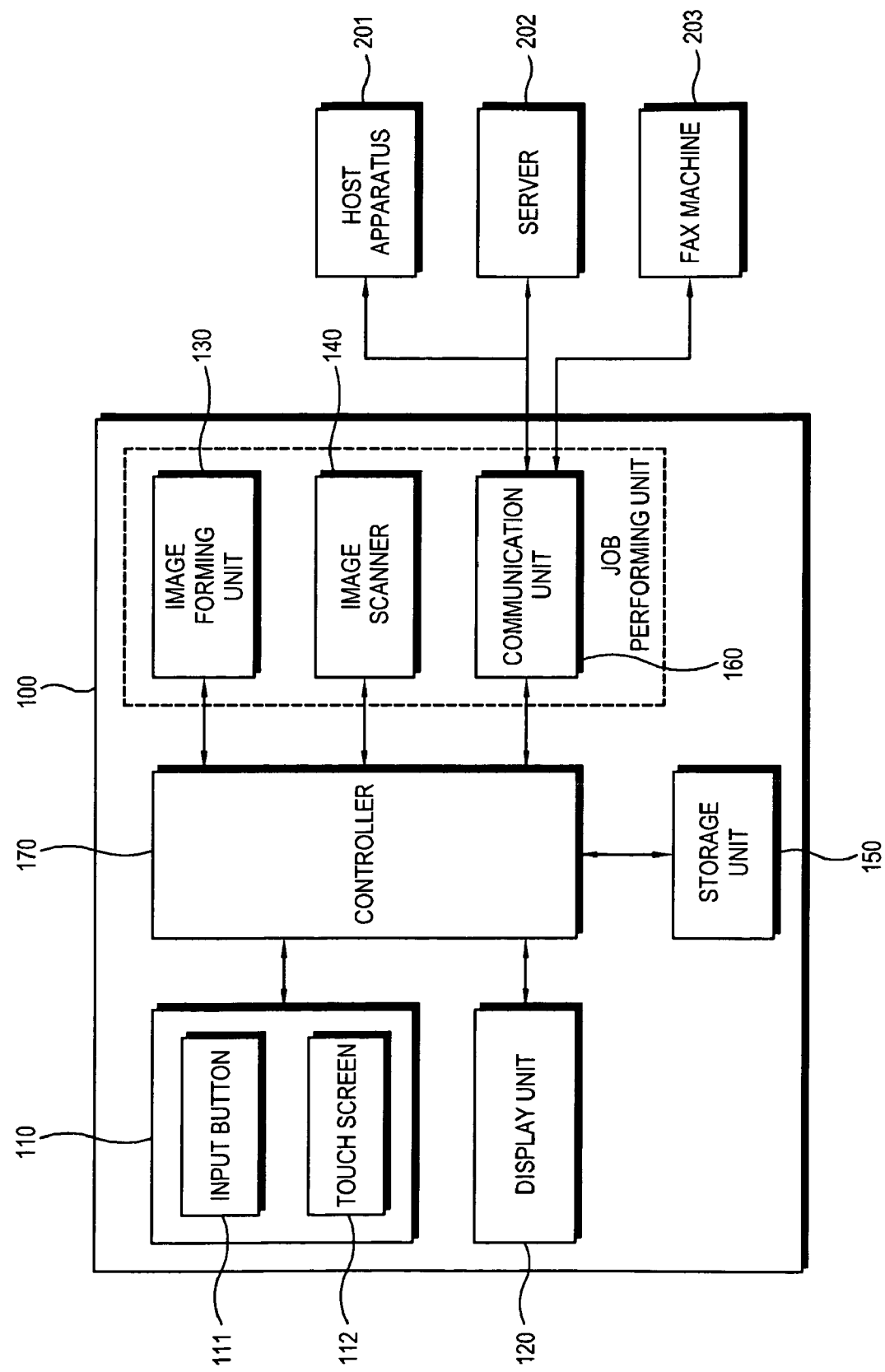
FIG. 1 is a block diagram of an image forming apparatus according to an exemplary embodiment.

FIG. 1 is a block diagram of an image forming apparatus 100 according to an exemplary embodiment. The image forming apparatus 100 may include a printer, a photocopier, a scanner, a facsimile or a multi-function device which has at least two functions.

As shown therein, the image forming apparatus 100 according to the exemplary embodiment includes a user operation unit 110, a display unit 120, an image forming unit 130, an image scanner 140, a storage unit 150, a communication unit 160 and a controller 170.

The user operation unit 110 receives data or a command from a user.

The user operation unit 110 includes an input button 111 provided in the image forming apparatus 100 (hereinafter to be called also "hard key" or "key pad"), and a touch screen 112 receiving a command by a user's touch (hereinafter, to be called also "touch panel" or "touch pad").

The touch screen 112 may include a graphic user interface (hereinafter to be called also "GUI") which is generated by an execution of a predetermined application and displayed on the display unit 120 to receive an input by a user's touch.

The GUI may include a menu icon which is displayed on an initial screen of the image forming apparatus 100 (hereinafter, to be called also "standby screen" or "background screen") to select a function of the image forming apparatus 100, and a handwriting input window 22 (refer to FIG. 2) which is displayed on a part of the initial screen and makes a handwriting input by a user available.

The image forming apparatus 100 may further include an electronic pen (or a digital pen) additionally provided for a user's input in handwriting and an optical character reader (OCR) which recognizes a character with the electronic pen as the user operation unit 110.

A user performs a log-in process inputting an ID and a password assigned for each user account. The log-in includes an administrator log-in in which setting and change of all environments of the image forming apparatus 100 is available without additional limitation on access.

If the user log-in or the administrator log-in is performed, the image forming apparatus 100 identifies and permits the performed log-in. According to the exemplary embodiment, a user includes an administrator.

If a user logs in the image forming apparatus 100, the image forming apparatus 100 determines an existence of a shortcut set for a user who has logged in. Upon reception of the user's input in handwriting, the image forming apparatus 100 performs a job corresponding to a shortcut.

The display unit 120 displays thereon a setting and operation status of the image forming apparatus 100 and may display a UI screen to receive various commands from a user. The display unit 120 may include a thin film transistor—liquid crystal display (TFT-LCD) and a driver (not shown) to drive the TFT-LCD.

In the image forming apparatus 100, the image manipulation unit 110 may be provided as an icon on the display unit 120 which is selected by a user's touch. Thus, the user operation unit 110 and the display unit 120 may be provided as a single configuration rather than separate configurations.

The display unit 120 may include a first display unit provided in the image forming apparatus 100 and a second display unit provided in a host apparatus 201 connected to the image forming apparatus 100 by the communication unit 160. If the display unit 120 includes the second display unit, a UI which is displayed on the second display unit to be selected as the user operation unit 110 is a remote user interface (RUI). In this case, a user's command is received from the host apparatus 201 connected to the image forming apparatus 100 by the communication unit 160.

If a print command is received, the image forming unit 130 forms an image on at least one print medium (paper) based on print data. The print operation includes a print operation for received fax data, a print operation to copy a scanned document, and a print operation for print data received from the outside through the host apparatus 201 including a server or print data stored in an inside (hard disk drive) or outside (USB memory stick) of the image forming apparatuses 100.

The image scanner 140 scans a print medium (document) and forms a scan image. The print medium includes a document, a photo, a film and the like. The image scanner 140 may include a scan unit which scans the print medium and generates an image.

The image scanned by the image scanner 140 may be changed into a fax signal and transmitted to the outside by the communication unit 160 (to be described later) or be printed, i.e., copied by the image forming unit 130.

The storage unit 150 stores therein print data, fax data, image data scanned by the image scanner 140, data received from the outside connected through the communication unit 160, various setting information of the image forming apparatus 100 through the user operation unit 110, setting information of a shortcut (hereinafter, to be also called hot key, icon and quick menu) set for each user account of the image forming apparatus 100, user authentication information for each user account, usage authorization information and the like.

The shortcut setting information which is stored in the storage unit 150 includes function information corresponding to a shortcut registered for each user, and a name of the shortcut.

The storage unit 150 may further store therein data received from the outside (including fax data) through the communication unit 160.

The storage unit 150 includes an internal storage medium such as HDD and an external or portable storage medium such as a USB memory stick, a memory card (memory stick, CF card and MMC), and a memory card slot.

The communication unit 160 performs a data communication with the outside including the host apparatus 201 and the server 202, and receives print data in a predetermined print language from the outside.

The communication unit 160 may include a wired/wireless communication module which is connected to an external device such as the host apparatus 201 by a local connection or in a network by a predetermined protocol, or an interface (e.g. USB port) which is connected with a portable storage medium such as a USB memory stick.

The communication unit 160 may include a fax communication module (e.g. modem) which changes image data generated by the image scanner 140 into a fax signal and transmits the fax signal to an external fax machine 203 (including a multi-function device having a faxing function) through a public switched telephone network (PSTN) or which receives a fax signal from the outside.

The communication unit 140 may perform a scan to host function or a scan to server function which transmits a scan image to an external device such as the host apparatus 201 or the server 202 by a predetermined protocol, or perform a scan to email function to transmit the scan image to the outside or perform a scan to USB function to store the scan image in the connected USB memory stick.

According to the exemplary embodiment, the image forming unit 130, the image scanner 140 and the communication unit 160 may be included in a job performing unit which performs a job according to a predetermined function corresponding to a registered shortcut.

The controller 170 controls the image forming apparatus 100 as a whole. More specifically, the controller 170 controls the display unit 120 to display thereon a touch screen to be selected by a user, and performs an operation corresponding to a user's input if a user input a command by touching the displayed touch screen.

Figure 2:
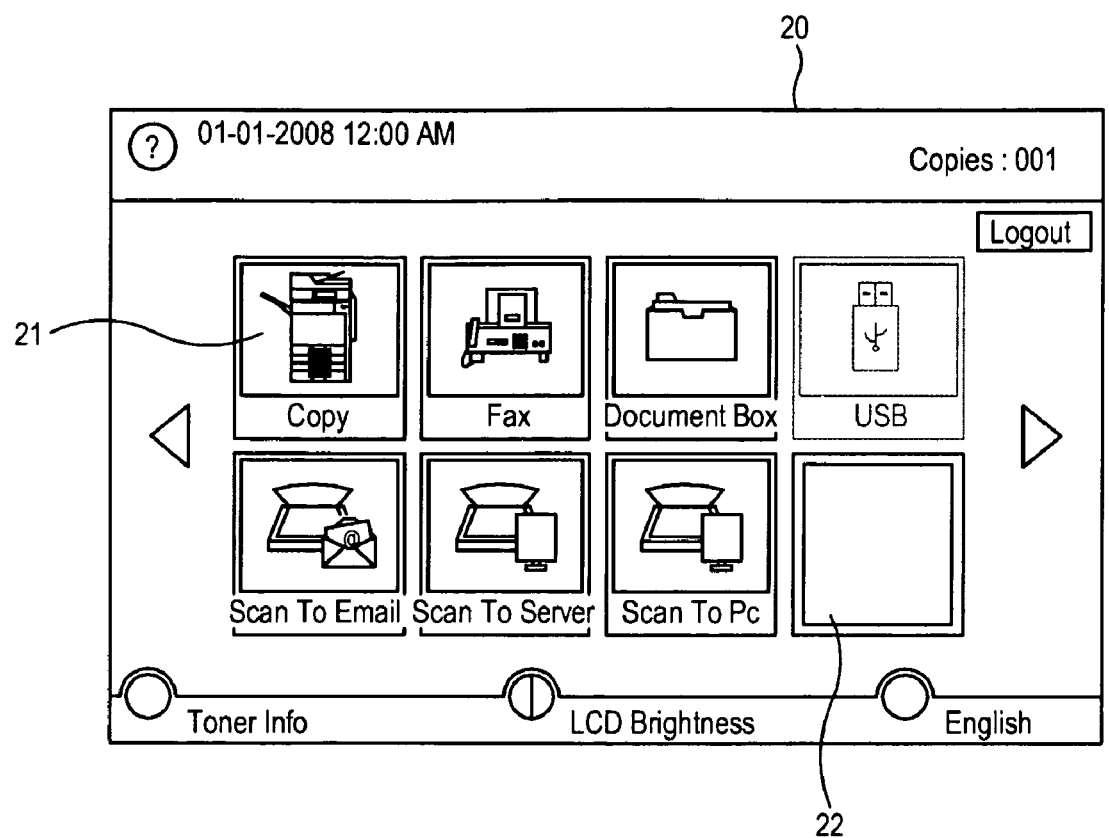
FIGS. 2 to 4 illustrate an initial screen of the image forming apparatus according to the exemplary embodiment.
Figure 3:
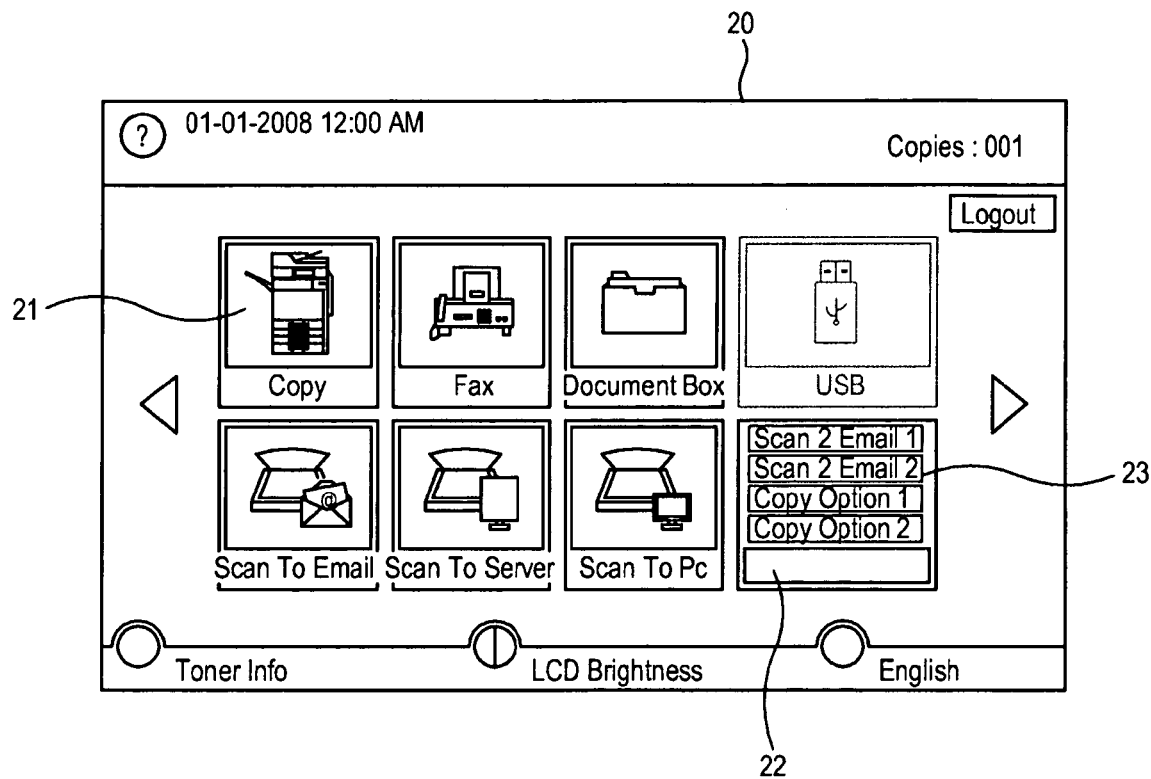
Figure 4:
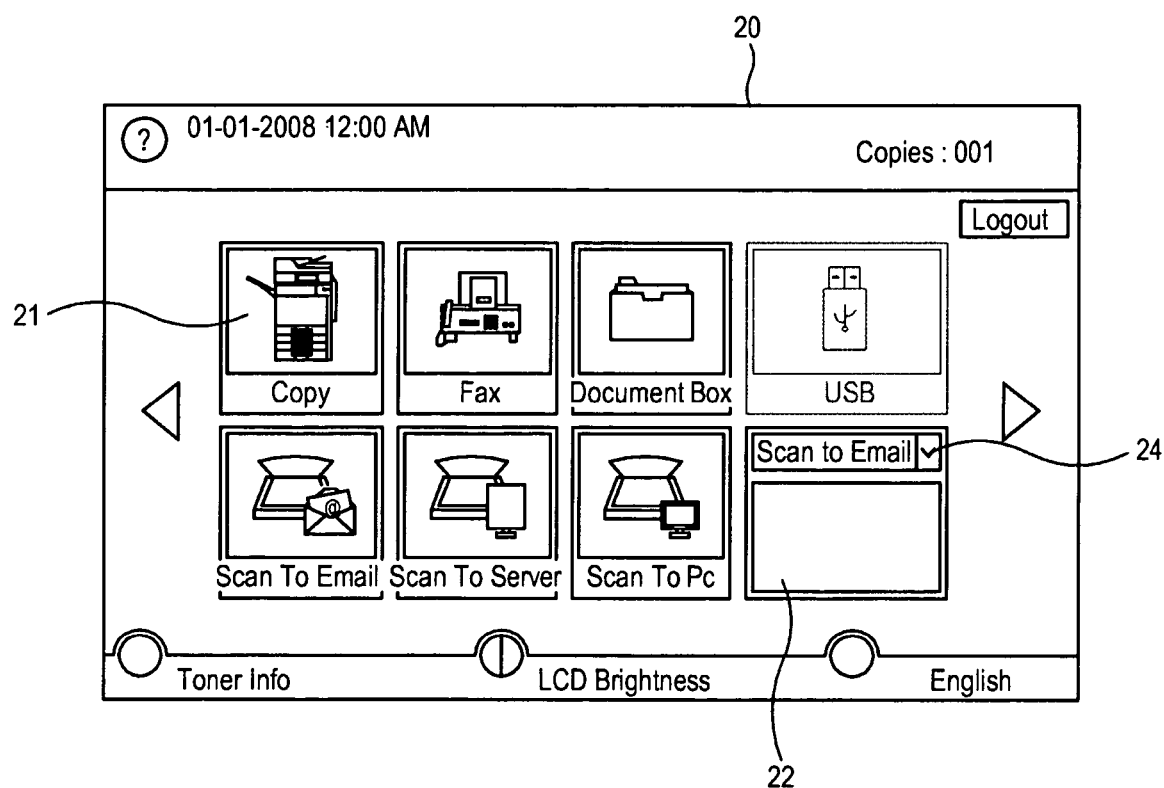

FIGS. 2 to 4 illustrate an initial screen 20 of the image forming apparatus 100 according to the exemplary embodiment.

As shown in FIG. 2, the controller 170 controls the display unit 120 to display an initial screen (standby screen or background screen) 20 including a handwriting input unit 22 which is provided on a part of a touch screen and makes a handwriting input by a user available.

The initial screen 20 in FIG. 2 may further include at least one menu icon 21 to select various functions supported by the image forming apparatus 100.

A user may input in the handwriting input window 22 in FIG. 3 a character (e.g., Korean alphabet, English alphabet, special characters, etc.), numbers, shapes (e.g., triangle, square, circle, etc.) and a gesture in a predetermined direction (e.g., horizontal line, vertical line, oblique line, rotation, etc.) to execute the shortcut by using an electronic pen (or a digital pen) additionally provided for a user's handwriting input as the user operation unit 110.

The input character, number, shape and gesture are set in a name of the corresponding shortcut and prestored in the storage unit 150.

The name of the shortcut may be set by combination of at least two of character, number and shape.

The controller 170 detects a user's touch in the handwriting input window 22, and determines whether there is a prestored shortcut in the name corresponding to the character, number, shape, gesture or a combination thereof.

More specifically, the controller 170 compares a handwriting input in the handwriting input window 22 with the job prestored in the storage unit 150, and executes a corresponding function if there is a shortcut set in the name of the input handwriting according to the comparison result.

For example, if Number 1 is set as a shortcut to perform a scan to email function, the controller 170, upon reception of the input of the Number 1, detects an input of the number 1 by using the OCR, compares the detected number 1 and the shortcut setting information set in the storage unit 150, confirms the setting of the scan to email function as the Number 1 and controls the job performing unit (e.g. image scanner 140 and the communication unit 160) to perform the scan to email function.

More specifically, the controller 170 controls the display unit 120 to display an option (e.g., sender's mail address, receiver's mail address, title of e-mail and message) setting screen and receives a user's input through the user operation unit 110 corresponding to the displayed option setting screen as in the case where a user typically selects the scan to email function from a menu.

If the option setting is completed, the controller 170 controls the image scanner 140 to generate a scan image by scanning the print medium, and controls the communication unit 160 to transmit the generated scan image by email according to the input option.

The storage unit 150 of the image forming apparatus 100 may store therein a shortcut of a job for which even an option is set such as the sender's mail address, receiver's mail address, a title of e-mail and a message. If the shortcut is registered by job, the option setting process may be avoided upon a user's input of the number 1 in the handwriting input window 22.

Thus, a user may set a shortcut in different names (e.g., numbers 1 and 2) for a plurality of receivers which is frequently used, and use the scan to email function by inputting the numbers in handwriting in the handwriting input window 22.

Likewise, if a character C is set as a shortcut to perform a copying function, the controller 170, upon reception of a user's input of the character C, detects the input of the character C by using the OCR, compares the detected character C and shortcut setting information set in the storage unit 150, confirms the setting of the copying function set as the character C according to the comparison result and controls the job performing unit (e.g., image scanner 140 and the image forming unit 130) to perform the copying function.

That is, the controller 170 controls the image scanner 140 to scan the print medium and generate a scan image, and controls the image forming unit 130 to print the generated scan image.

The shortcut corresponding to the character C may be set to perform the preset copying function for which even an option including direction of print medium, a copying magnification, mono/color, both sides/single side, concentration value, etc.

A user may set a shortcut of a plurality of frequently used copying options in different names (e.g. C1 and C2, combination of characters and numbers) and may use the copying function according to each option by inputting the shortcut in handwriting in the handwriting input window 22.

As shown in FIG. 3, the initial screen 20 of the image forming apparatus 100 may further display thereon an icon list including at least one shortcut icon 23, other than the handwriting input window 22 for a user's handwriting.

The shortcut icon 23 which is included in the icon list in FIG. 3 is an icon for a function or a job of the image forming apparatus 100 set as a shortcut for a predetermined user (i.e., a user which logs in the image forming apparatus 100). The shortcut icon 23 includes a text and a graphic and is enabled to be selected by a user.

Thus, a user may select the icon and execute the shortcut other than the handwriting, thereby using the shortcut function more conveniently.

The image forming apparatus 100 may list up the shortcut icon 23 corresponding to the registered shortcut if a user manipulates a particular button (or particular GUI) from the initial screen 20 in FIG. 2.

Even if a user does not remember the name of the preset shortcut, the particular button may be manipulated by a user's request to confirm the displayed shortcut icon 23 and execute the concerned shortcut.

The icon list which is displayed by a user's manipulation may be displayed adjacently to the handwriting input window 22 as in FIG. 3 or may be overlaid to a menu provided to select a function of the image forming apparatus 100 displayed in a location spaced from the handwriting input window 22.

As shown in FIG. 4, the icon list of the initial screen 20 of the image forming apparatus 100 may be displayed as a shortcut list box 24 to be selected by a user.

The displayed shortcut list box 24 is a drop down list. If a user selects the shortcut list box 24, the shortcut item registered for a user is listed up.

A user may select a predetermined item from the listed items and execute the shortcut other than in handwriting, thereby using the shortcut function more conveniently.

The image forming apparatus 100 may display the shortcut list box 24 if a user manipulates a particular button from the initial screen 20 in FIG. 2.

Even if a user does not remember the name of the prestored shortcut, the shortcut list box 24 may be confirmed and the shortcut may be executed easily.

If the shortcut list box 24 is used as in FIG. 4, a user may confirm the set shortcut easily without limitation on the size of the initial screen 20 even though many shortcuts are set for a predetermined user.

If a predetermined number or a character is input in handwriting in the handwriting input window 22, the controller 170 may control the display unit 120 to display thereon at least one automatic completion list and a recommendation list as a prestored job list corresponding to the handwriting input.

For example, if a user inputs a character C in the handwriting input window 22, C1 and C2 may be displayed. If a user inputs a character S, Scan to Email, Scan to Server and Scan to USB may be displayed. The automatic completion list is a name of the registered shortcut.

If several characters (e.g., at least two characters) are input, the automatic completion list may be displayed.

A user may select to display one of display options in FIGS. 2 to 4 for the shortcut menu from an initial screen setting of the image forming apparatus 100. The image forming apparatus 100 may display a shortcut in various forms as well as the initial screen 20 in FIGS. 2 to 4.

The image forming apparatus 100 may receive a user's selection whether to register a shortcut of a job if the job is performed by a predetermined function.

Figure 5:
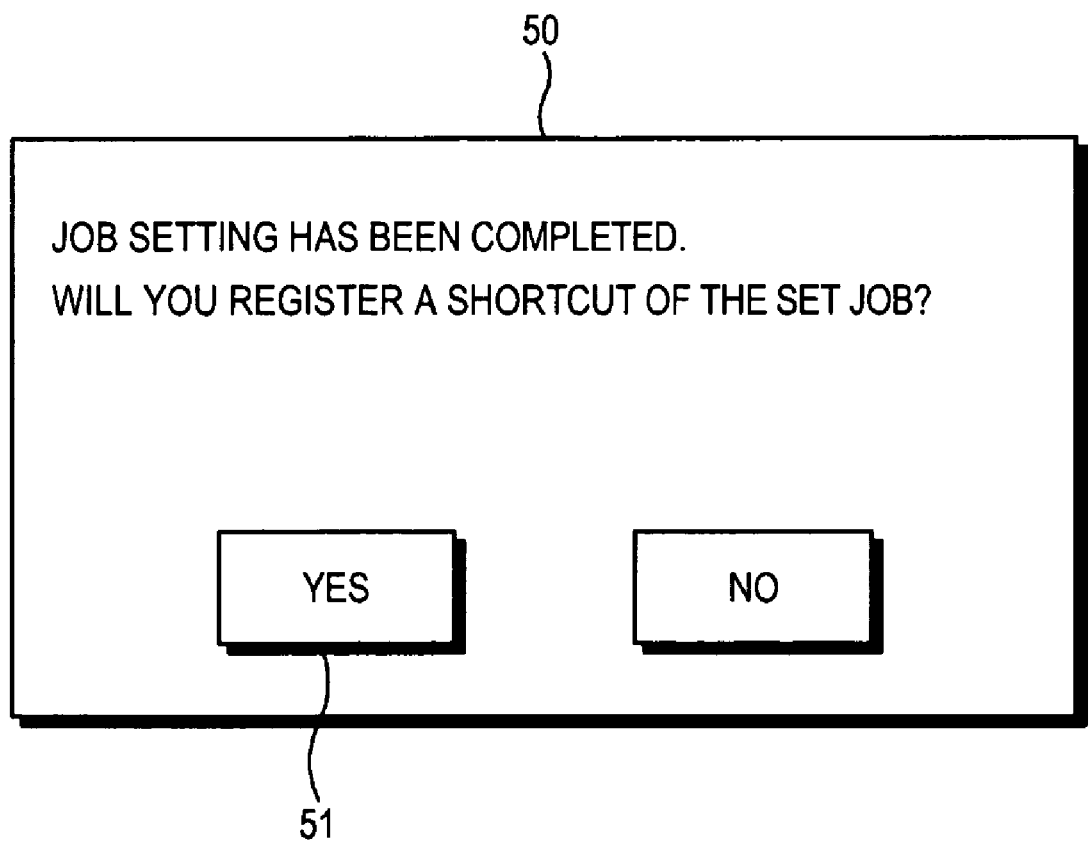
FIG. 5 illustrates a registration of a shortcut in the image forming apparatus according to the exemplary embodiment.

FIG. 5 illustrates a registration of a shortcut in the image forming apparatus 100.

Referring to FIG. 5, if a user performs a job for a predetermined receiver after log-in, e.g., sends a fax, and then completes setting of the option (e.g., receiver information and application of an error correction mode, etc.), the controller 170 may control the display unit 120 to display thereon a UI message including an icon 51 provided for a user to register the shortcut of the set job as in FIG. 5.

A user may select to register the shortcut by touching the user operation unit 110 corresponding to the message displayed in FIG. 5.

If a user selects the registration icon 51 to register the shortcut, the controller 170 may control the display unit 120 to display thereon a recommendation list of names which can be registered as a shortcut.

The list may include a name indicating a current function (e.g., Fax 1, F1 or a combination of predetermined characters and receiver information), current time information, a name indicating product information of the image forming apparatus 100 (e.g., a combination of model name and function), etc.

The registered shortcut is stored in the storage unit 150 together with user account information, name, function, and option information.

A user may input in handwriting the name of the registered shortcut in the handwriting input window 22 in FIGS. 2 to 4 and easily execute the function by the shortcut.

The image forming apparatus 100 may receive a user's selection to register a predetermined job after completion of the job as well as at the time of setting the option.

With the foregoing configuration, a handwriting input process of the image forming apparatus 100 will be described with reference to FIGS. 6 and 7.

Figure 6:
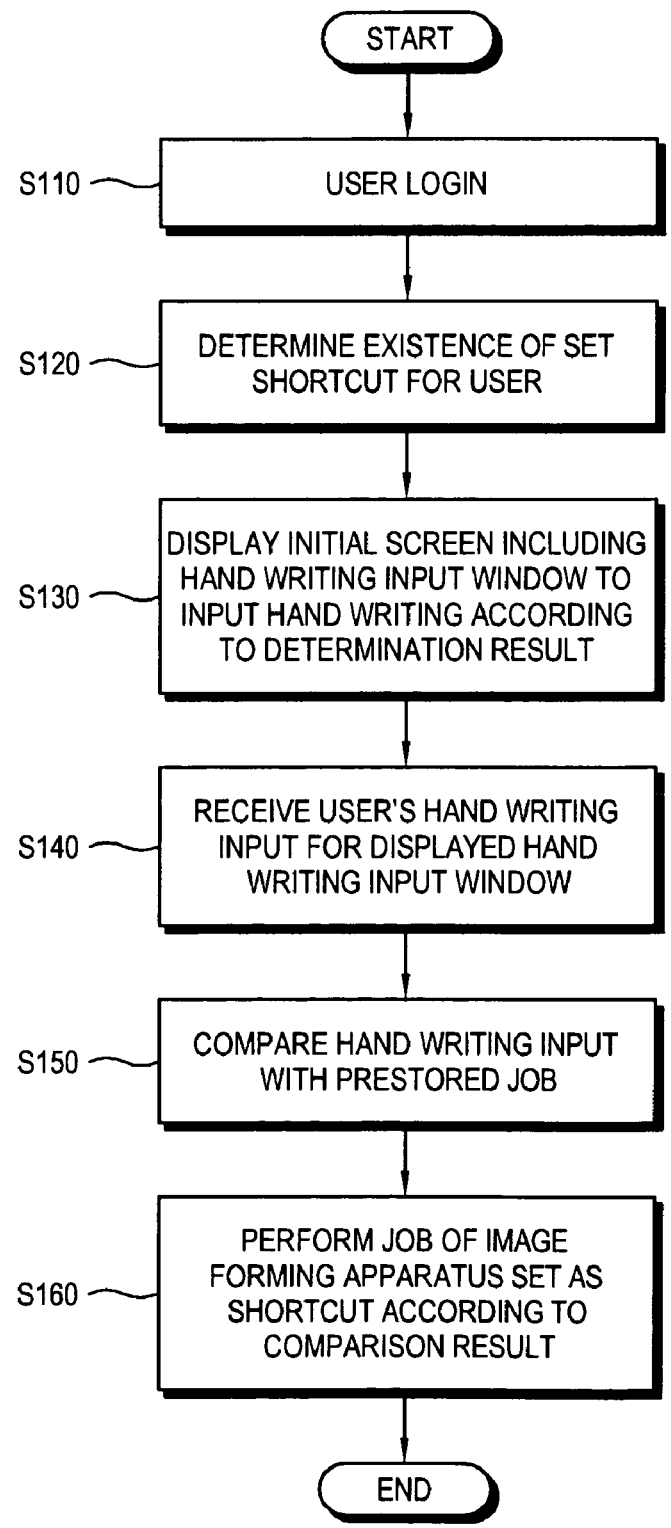
FIG. 6 is a flowchart which illustrates a job performing method of the image forming apparatus according to the exemplary embodiment.

FIG. 6 is a flowchart which illustrates a shortcut executing process of the image forming apparatus 100.

As shown therein, a user may log in the image forming apparatus 100 by using the user operation unit 110 (S110).

Corresponding to the login at operation S110, the controller 170 determines the existence of the shortcut set for a user who has logged in (S120). The controller 170 may determine the existence of the shortcut for a user who has logged in, by using the shortcut setting information of the storage unit 150.

According to the determination result at operation S120, the controller 170 controls the display unit 120 to display thereon the initial screen 20 including the handwriting input window 22 (S130) which make a user's handwriting available. The displayed initial screen 20 may include the handwriting input window 22 provided in a part thereof, or may further include the shortcut icon 23 or the shortcut list box 24 as the icon list which are displayed together with the handwriting input window 22 as in FIGS. 3 and 4.

The shortcut icon 23 or the shortcut list box 24 may be displayed upon a user's request. The shortcut icon 23 or the shortcut list box 24 is enabled to be selected by a user according to the determination result at operation S120.

The controller 170 may receive a user's input in handwriting with respect to the displayed handwriting input window 22 (S140). A user may input numbers, characters, shapes, and gestures in predetermined direction by using an electronic pen provided as the user operation unit 110.

A user may input his/her command by selecting the shortcut icon 23 or the shortcut list box 24 enabled at operation S130 as well as the handwriting input.

At operation S140, the display unit 120 may further display thereon the prestored job list, i.e., at least one automatic completion list including the hand written number or character corresponding to the user's handwriting input. Then, a user may select one from the displayed automatic completion list.

The controller 170 compares the handwriting input at operation S140 with the job prestored as the shortcut in the storage unit 150 (S150).

According to the comparison result at operation S150, the controller 170 performs the function or the job of the image forming apparatus 100 registered as the shortcut for a user who has logged in (S160).

Figure 7:
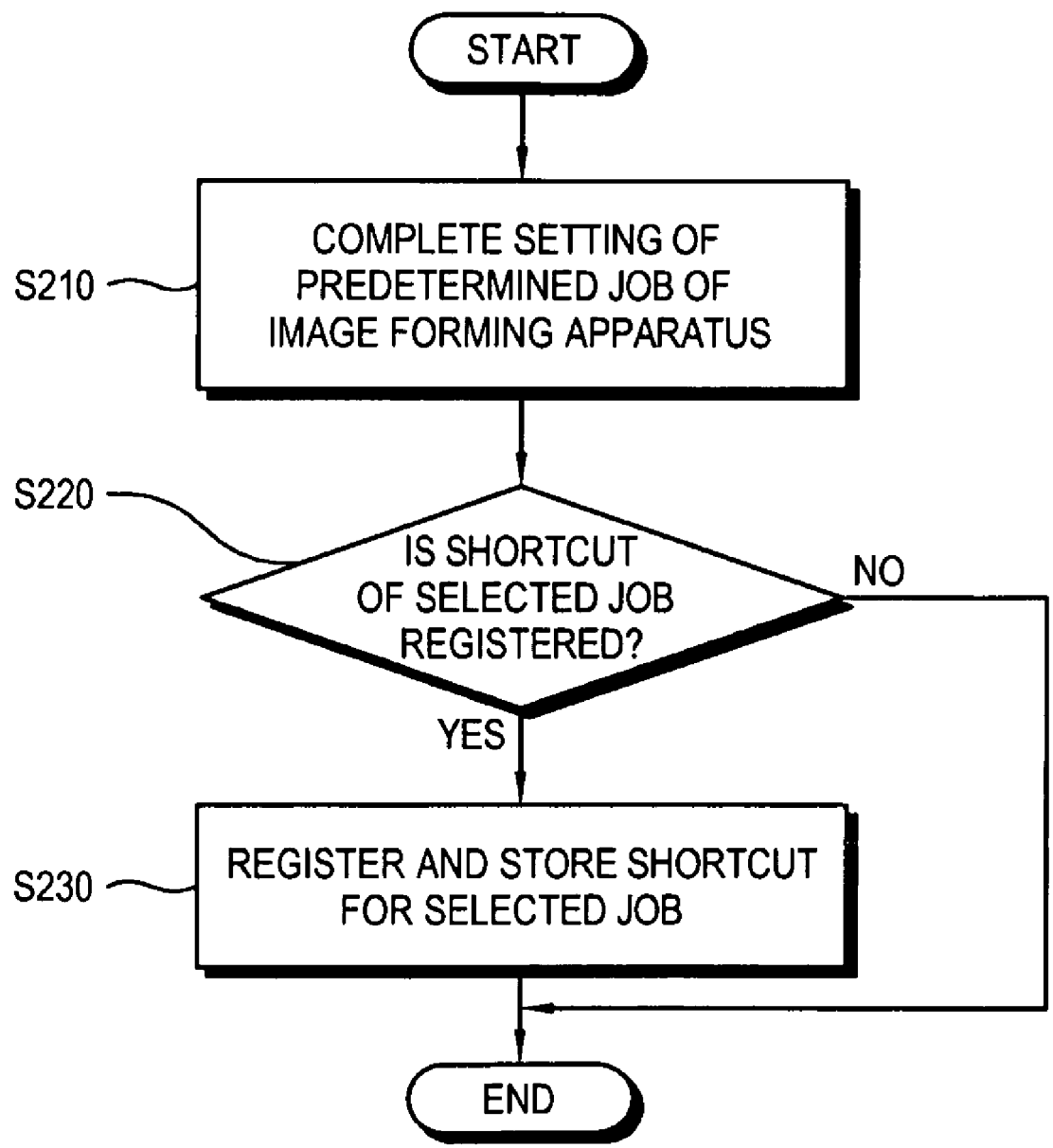
FIG. 7 is a flowchart which illustrates a short registration method of the image forming apparatus according to the exemplary embodiment.

FIG. 7 is a flowchart which illustrates a shortcut registration process of the image forming apparatus 100.

As shown therein, a user may complete setting of a job using a predetermined function of the image forming apparatus 100 (S210).

A user may select whether to register the shortcut for the job whose setting has been completed (S220). The controller 170 may control the display unit 120 to display thereon the UI message to register the shortcut as in FIG. 5.

According to the selection at operation S220, the controller 170 registers the shortcut of the job for a user who has logged in, and stores the shortcut in the storage unit 150 (S230). The controller 170 may register the job in a predetermined name including at least one of character, number, shape and gesture.

A user may handwrite the name of the predetermined shortcut in the handwriting input window 22 at operation S130 in FIG. 6 and easily execute the job registered at operation S230 by using the handwriting.

Accordingly, the image forming apparatus 100 provides the shortcut of a function frequently used by a user in an initial screen of the image forming apparatus 100 and enables a user to easily select and perform a particular function or a job.

Further, the shortcut is executed by a user's handwriting, and the image forming apparatus 100 improves usability and is more user-friendly.

As described above, the image forming apparatus and the job performing method thereof provides a shortcut for a frequently used function on an initial screen and enables a user to easily select and perform a particular function.

Further, the image forming apparatus and the job performing method executes a shortcut upon reception of a user's input in handwriting and improves usability and is more user-friendly.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A job performing method of an image forming apparatus which comprises a touch screen making a handwriting input available, the method comprising:
   displaying a handwriting input window in a part of an initial screen displayed on the touch screen and making a user's handwriting input available;
   inputting a handwriting by the user in the displayed handwriting input window;
   comparing the input handwriting with a prestored job;
   performing the prestored job by the image forming apparatus according to the comparison result;
   setting an option for a predetermined job of the image forming apparatus; and
   selecting whether to register a shortcut corresponding to the handwriting input with respect to a job for which the option is set.

2. The method according to claim 1, further comprising logging in the image forming apparatus by the user.

3. The method according to claim 2, wherein the displaying the handwriting input window comprises further displaying at least one of a prestored job list and an icon list corresponding to a handwriting input in the handwriting input window.

4. The method according to claim 3, wherein the job list and the icon list are displayed corresponding to the user who has logged in.

5. The method according to claim 3, wherein the job list and the icon list are displayed by the user's request.

6. The method according to claim 1, further comprising displaying a job performing result.

7. The method according to claim 1, wherein the inputting the handwriting comprises inputting at least one of a number, a character, a shape and a directional gesture.

8. The method according to claim 1, further comprising displaying a recommendation list for a name of the registered shortcut according to the selection result.

9. An image forming apparatus, comprising:
   a display unit which displays a handwriting input window making a user's handwriting input available in a part of an initial screen of the image forming apparatus;
   a user operation unit which comprises a touch screen to receive a handwriting input with respect to the displayed handwriting input window;
   a storage unit which stores therein a job corresponding to the handwriting input;
   a job performing unit which performs a job for a predetermined function of the image forming apparatus; and
   a controller which compares the handwriting input received through the touch screen with a job prestored in the storage unit, and controls the job performing unit to perform a corresponding job according to the comparison result,
   wherein the user operation unit sets an option for a predetermined job of the image forming apparatus and selects whether to register a shortcut of the job for which the option is set, corresponding to the handwriting input.

10. The image forming apparatus according to claim 9, wherein the user operation unit receives a user login to the image forming apparatus.

11. The image forming apparatus according to claim 10, wherein the display unit further displays at least one of a prestored job list and an icon list corresponding to a handwriting input in the handwriting input window.

12. The image forming apparatus according to claim 11, wherein the job list and the icon list are displayed corresponding to the user who has logged in.

13. The image forming apparatus according to claim 11, wherein the job list and the icon list are displayed by a user's request.

14. The image forming apparatus according to claim 9, wherein the display unit displays thereon a job performing result.

15. The image forming apparatus according to claim 9, wherein the handwriting input comprises at least one of a number, a character, a shape and a directional gesture.

16. The image forming apparatus according to claim 9, wherein the job performing unit comprises at least one of an image forming unit performing a print operation, an image scanner scanning a document and a communication unit communicating with an external device, and
   the communication unit comprises at least one of a fax communication module transmitting and receiving a fax, a network communication module performing a network communication, and an interface which is connected with an hard disc drive (HDD) or a universal serial bus (USB).

17. The image forming apparatus according to claim 9, wherein the display unit displays a recommendation list for a name of the registered shortcut according to the selection result.

* * * * *